US009210212B2

(12) United States Patent　　　(10) Patent No.:　　US 9,210,212 B2
Ivashin et al.　　　　　　　　　　(45) Date of Patent:　　Dec. 8, 2015

(54) METHOD FOR HOST PREVIEW DURING A REMOTE DESKTOP SESSION

(75) Inventors: Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 924 days.

(21) Appl. No.: 13/433,727

(22) Filed: Mar. 29, 2012

(65) Prior Publication Data

US 2013/0262560 A1　　Oct. 3, 2013

(51) Int. Cl.
*G06F 15/16* (2006.01)
*H04L 29/08* (2006.01)
*G06F 3/14* (2006.01)
*G06F 9/44* (2006.01)

(52) U.S. Cl.
CPC .............. *H04L 67/08* (2013.01); *G06F 3/1454* (2013.01); *G06F 9/4445* (2013.01); *H04L 67/12* (2013.01); *H04L 67/146* (2013.01)

(58) Field of Classification Search
CPC ..... G06F 3/1454; G06F 9/4445; H04L 67/08; H04L 67/146; H04L 67/12
USPC ........................................................ 709/203
See application file for complete search history.

(56) References Cited

U.S. PATENT DOCUMENTS

| | | | | |
|---|---|---|---|---|
| 7,716,273 | B2* | 5/2010 | Soin et al. ..................... | 709/203 |
| 8,555,274 | B1* | 10/2013 | Chawla et al. .................... | 718/1 |
| 2004/0255029 | A1* | 12/2004 | Manion et al. ................ | 709/227 |
| 2006/0046851 | A1* | 3/2006 | Blaho ............................. | 463/42 |
| 2008/0201457 | A1* | 8/2008 | London ......................... | 709/222 |
| 2010/0077055 | A1* | 3/2010 | Cohen ........................... | 709/213 |
| 2010/0111410 | A1* | 5/2010 | Lu et al. ........................ | 382/166 |
| 2010/0138768 | A1* | 6/2010 | Lonkar et al. ................. | 715/769 |
| 2011/0066671 | A1* | 3/2011 | Motohashi .................... | 709/201 |
| 2011/0153716 | A1* | 6/2011 | Malakapalli et al. ......... | 709/203 |
| 2011/0265009 | A1* | 10/2011 | Eby et al. ....................... | 715/740 |
| 2011/0276619 | A1* | 11/2011 | Khan et al. .................... | 709/203 |
| 2012/0311564 | A1* | 12/2012 | Khalid ............................. | 718/1 |
| 2013/0125009 | A1* | 5/2013 | DeLuca et al. ................ | 715/740 |

* cited by examiner

*Primary Examiner* — Anthony Mejia

(57) ABSTRACT

Updated image views of an actively changing desktop, in a remote desktop session being shared by a Remote Desktop terminal server, are displayed on the host's logon screen. Specifically, a Microsoft Window's based computer (host), which is communicating with a network projector (client) through a remote desktop connection, provides continually updating image views of the desktop being hosted in a remote desktop session onto the host screen such that a user locally positioned near the host may preview the desktop content being provide to, and output by, the remote projector.

20 Claims, 3 Drawing Sheets

METHOD FOR HOST PREVIEW DURING A REMOTE DESKTOP SESSION

CROSS-REFERENCE TO RELATED APPLICATION(S)

This application is related to commonly owned U.S. patent application Ser. No. 13/332,751, filed Dec. 21, 2011, which is hereby incorporated by reference in its entirety.

FIELD OF INVENTION

The present invention relates generally to the Remote Desktop Services components (formerly Terminal Services) of Microsoft Windows® operating systems, and pertains specifically to displaying a view of the hosted desktop in a remote desktop session on the hosting system's screen.

BACKGROUND

In a typical Microsoft remote desktop services configuration, a user that is positioned at a first computer (client) is provided with the user interface of desktops and applications running in a remote desktop session on a second computer (host) across a network. The computers are generally presumed to be located at some distance from one another.

The Microsoft Windows operating system generally groups user-program processes (threads and resources) by session identifiers. Session 0 is reserved for services and does not support interactive processes (i.e. graphical user interface (GUI) elements and user input devices). Processes are further separated within sessions by named Windows Stations. The first named station in each session is "Winsta0" and it is the only station in a session that can display a user interface and receive user input. Processes are divided within each station by a collection of Windows Desktops, or logical display surfaces. Only one desktop can be active at a time and is called the input desktop. Station Winsta0 has four desktops: Winlogon (the Logon screen), Default (the user desktop), ScreenSaver, and Secure Desktop (UAC prompts).

During a remote desktop connection, the Microsoft Windows Remote Desktop server hosts the remote user's desktop in a separate and secure Windows session. For security reasons, particularly since the host is presumed to be quite remote from the client, the active user is switched to the Windows Logon desktop in the interactive station Winsta0. This forces the local display on the Remote Desktop host computer to show only the Logon screen, effectively masking activity in the remote desktop session. Since only one desktop at a time can be given interactive control, human interface devices (HID) on the host machine, including keyboards and mice, have their input redirected to this Logon screen input desktop. This prevents device interference with the activities occurring within other hosted desktop sessions. Inputs to the hosted desktop arrive instead from the devices attached to the client computer. Client hardware input events directed into the GUI of the remote desktop connection client are forwarded to the host remote desktop session as special remote desktop keyboard and mouse devices. They operate within the remote desktop session as if similar devices were physically connected to the host session.

A network projector configured as a remote desktop client may establish remote desktop connections to host computers on the network for obtaining views of their desktops for display output by the projector. The resulting display output will be similar to results obtained by direct cabling of those same computers' video output ports to the projector's video inputs. However, in this remote desktop configuration the network allows easier access to any number of computers. Wireless networks may further reduce cabling requirements between network projectors and PCs making the process more convenient. And remote desktop connections can provide added freedom in selecting or matching output resolution among the connecting devices.

However, unlike conventional remote desktop configurations, a projector does not generally have a keyboard and mouse interface. This discourages their use for making typical remote desktop connections. Even if such device interfaces are provided, manipulating a desktop display output by a projector can prove difficult as the projected content could be positioned behind the presenting user. Operating keyboard and mouse interfaces connected to a projector may also restrict a presenter's movement as the operating range of those devices relative to the projector may be limited.

In some operating systems, a streaming feature is provided for a computer to connect with a remote projector and transmit views of the computer's desktop to the projector for display output. Unlike a remote desktop connection, the transmitting computer's input devices and display maintain interaction with and views of the computer's desktop. The performance of this feature, however, is much lower than can be obtained through a conventional remote desktop connection that can optimize the communication to reduce delays, provide better image quality, and support smooth animation and video. Also, this feature may force changes to the computer's desktop resolution in order to match the projector's output capabilities. The new resolution may not be ideally suited to the computer's display (i.e. laptop LCD resolution) and result in a poor viewing experience for the computer's user.

In a common presentation environment where a network projector and a laptop are used, both devices are located within the same room nearby a presenter. The presenting user desires the use of his laptop as he is comfortable with the keyboard and track-pad controls it provides, and the projector display surface may be at his back. As such, it would be advantageous if a remote desktop connection between the projector and the laptop could simultaneously provide the remote desktop for display output on the projector along with a view of the same output on the local screen of the host computer. In this way, the high performance remote desktop solution could be used and the presenting user could keep focus on his laptop screen, as is customary, instead of looking at the projection screen.

SUMMARY OF INVENTION

The present invention provides a system, method, and computer-readable media that display and update image views of an actively changing desktop, in a remote desktop session being shared by a Remote Desktop terminal server, on the host's logon screen.

Specifically, the present invention enables a Microsoft Window's based computer (host), which is communicating with a network projector (client) through a remote desktop connection, to provide continually updating image views of the desktop being hosted in a remote desktop session onto the host screen such that a user locally positioned near the host may preview the desktop content being provide to, and output by, the remote projector.

When the remote desktop session is detected, a screen of the hosted desktop is captured and displayed on a logon screen of a host computer display. In an embodiment, detecting the remote desktop session comprises detecting an active session and obtaining an active console session identification and an active host session identification. Preferably, detecting includes searching for a process matching a name of a logon application and, if a process is found, comparing a session identification of the process to the active console session identification. Also preferably, detecting includes searching for a process matching the name of a client-server runtime system that manages processes in a logon session and, if a process is found, comparing a session identification of the process to the active host session identification.

In an embodiment, displaying the captured screen comprises providing a graphical user interface (GUI) with a preview window available on the logon screen of the host computer display. In another embodiment, captured screen data is transferred to a global shared memory mapped file. Updating a preview window is performed by checking for updated display data in the global shared memory mapped file. In another embodiment, the captured screen data is transferred using a named pipe. In a preferred embodiment, the capturing and displaying reoccur periodically.

The present invention may be used in combination with the invention described and claimed in commonly owned U.S. patent application Ser. No. 13/332,751, filed Dec. 21, 2011, which is hereby incorporated by reference in its entirety. In this related application, users can utilize their own familiar keyboard and mouse/track-pad input devices to manipulate a desktop display output by a network projector.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A network projector as described herein may be referred to as the client or the projector. This projector will provide a client-side application to a virtual network connection for displaying remote desktop content. A host as described herein is defined as a networked computer, laptop, or handheld device which can provide, among other things, the serving function in a virtual networking connection with the client. In an embodiment, the network projector incorporates a Windows embedded operating system providing Remote Desktop Connection Client application support. The host is a networked computer that provides the server component of Microsoft's Remote Desktop Services, called Remote Desktop Terminal Server.

Figure 1:
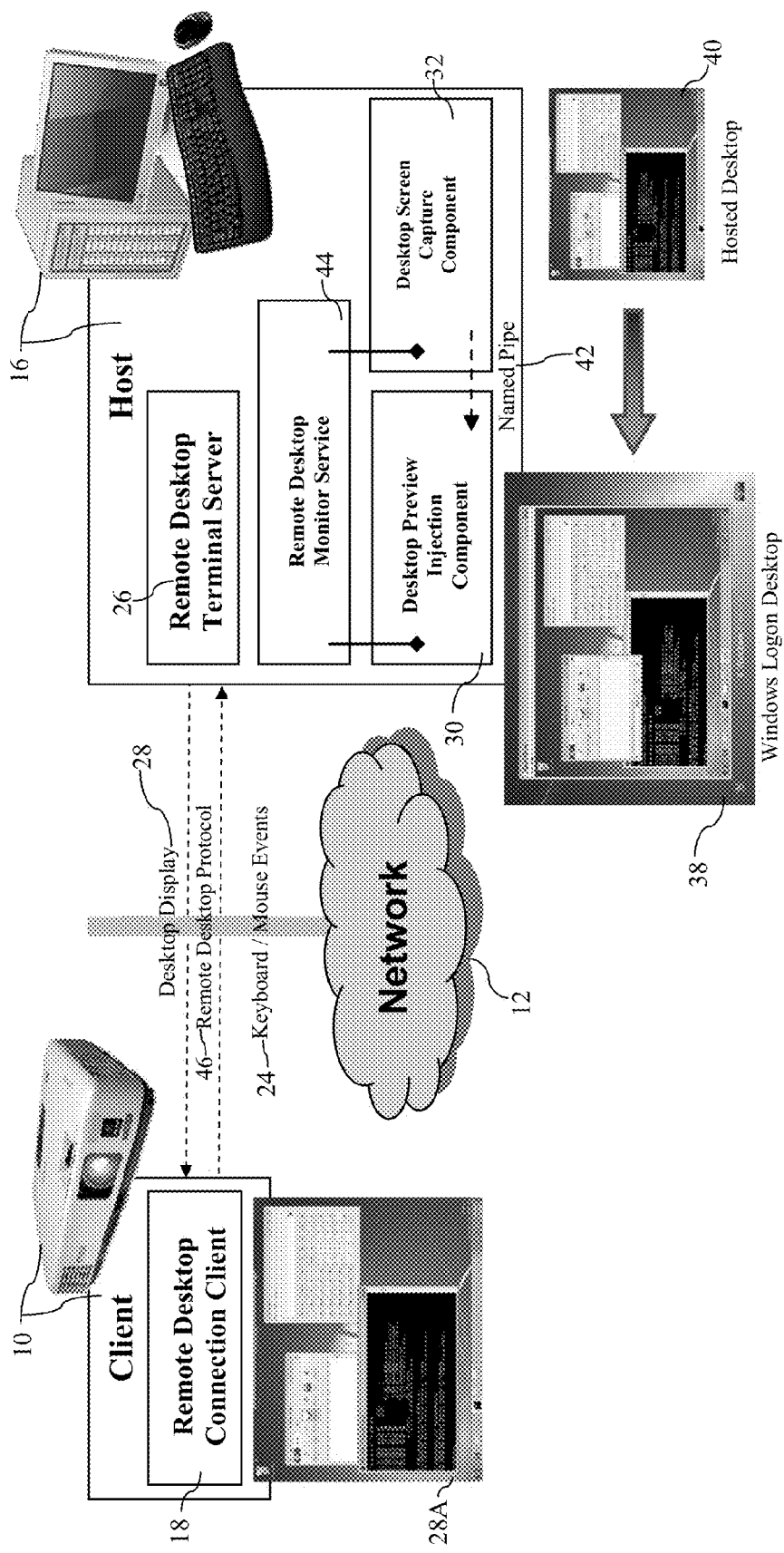
FIG. 1 is a general block diagram of the system of the present invention.

FIG. 1 is block diagram overview of the main components of the present invention. As discussed above, the client in the present invention is a network projector 10 that is connected to network 12. The network projector 10 (Client) may have a web server component that runs on projector 10 to provide an access interface for the host 16 to install necessary components and provides a way to initiate a remote desktop connection process. Details of the remote desktop connection process are not necessary for an understanding of the present invention but are disclosed in commonly owned U.S. patent application Ser. No. 13/332,751, filed Dec. 21, 2011, which is hereby incorporated by reference in its entirety. Hereinafter, network projector 10 will be referred to as client projector 10. As mentioned above, host 16 may be a networked computer as shown for example in FIG. 1, a laptop as shown for example in FIG. 2, or a handheld device. Host 16 will be generally referred to herein as host computer 16. In a preferred embodiment shown in FIG. 1, the client projector 10 incorporates a Windows embedded operating system providing Remote Desktop Connection Client 18 application support and host computer 16 incorporates a Windows operating system provided server component Remote Desktop Terminal Server 26.

The Remote Desktop Connection Client 18 is an application that executes in the client projector 10 to communicate with the host computer 16 using the Remote Desktop Protocol (RDP) 46, which is an interface through which the host computer 16 provides the desktop display 28 to the client projector 10 and the client projector 10 provides keyboard/mouse events 24 to the host computer 16 to control the remote desktop session. The Remote Desktop Connection Client 18 provides the user interface on the client for access and interaction with a remote desktop session. The desktop display 28 as projected by client projector 10 is shown as projected display 28A in FIG. 1.

The Remote Desktop Monitor Service 44 is a service module that runs on the host computer 16 in Windows Session 0. Typically this service is installed and running before a remote desktop session has been established. The service module's primary role is to detect the remote desktop connection and presence of a Window's remote desktop session. When it has been determined that the Windows Logon desktop has been enabled in station Winsta0 of the user session, the service begins an application launch process.

The application launch process loads and executes a Desktop Preview Injection Component 30 application into the Windows Logon desktop in station Winsta0 of the user session. It also loads and executes a Desktop Screen Capture Component 32 application into the user desktop containing the remote desktop session.

Like any Windows service, the Remote Desktop Monitor Service 44 module has a start and stop method. When started, in one embodiment, a timer event regularly polls for detection by executing the detection check mechanism. In another embodiment, a waiting thread signals when to begin the detection check mechanism. The detection mechanism enumerates the active Windows Terminal Service sessions using WTSEnumerateSessions with the WTS_CURRENT_SERVER_HANDLE option and finds the session whose State is set to WTSActive to indicate the active host WTS session id (i.e. WTS active id). If one does not exist, the detection check mechanism method ends until another retry interval at a later time.

Next, the detection mechanism obtains the active console session identification (i.e. WTS console id) using the WTSGetActiveConsoleSessionId method that will be used for comparison with the session id of the Window's Logon process. Since the Window's Logon process runs as SYSTEM in the user's session, the current process token privilege for the detection mechanism must next be elevated to SW_DEBUG_NAME to allow similar execution rights. The detection mechanism then enumerates all running processes in the system using the EnumProcesses method.

After enumeration, the detection mechanism searches for processes matching the name (identification) of the Window's Logon application (winlogon.exe). The searching method calls OpenProcess and GetModuleBaseName functions for each enumerated process to gather the process name. The process's id is also converted to a process session id using the ProcessIdToSessionId function. If the process with the matching name is found, the process session id is compared to the active console session id (WTS console id) obtained earlier. If the session ids match, then the Windows Logon process for the active remote desktop session has been properly detected. An application launching process opens the found process token and executes the Desktop Preview Injection Component 30 application into the found process session desktop via a CreateProcessAsUser function.

After enumeration, the detection mechanism also searches for a process matching the name of the client-server runtime subsystem that manages processes in the logon session (csrss.exe). If the process with the matching name is found, the process session id is compared to the active host WTS session id (WTS active id) obtained earlier. If the session ids match, then the hosted remote desktop process has been properly detected. An application launching process opens the found process token and executes the Desktop Screen Capture Component 32 application into the found process session desktop via a CreateProcessAsUser function.

The Desktop Preview Injection Component 30 application provides an application window that runs on the Windows Logon screen. This graphical user interface (GUI) window displays a visual "view" 38 of captured screen data collected by the Desktop Screen Capture Component 32 application. Since the Desktop Preview Injection Component 30 application's preview window is available on the Window's Logon screen, a user viewing the local display at the host machine can see captured screen data that mirrors the contents of the hosted session's desktop being controlled remotely and output by the client projector 10.

Since the host computer's HID devices are restricted to the Window's Logon desktop during a remote desktop connection, the keyboard and mouse input devices are available to the Desktop Preview Injection Component 30 application. This application could, for example, capture the mouse and keyboard events when the mouse cursor is active over a region of the preview window. As described in commonly owned U.S. patent application Ser. No. 13/332,751, these inputs can then be redirected for injection into the remote desktop session by passing them to the client via a separate remote desktop virtual channel. The inputs may also be redirected into the hosted desktop as injected events. In this way, interfacing with and capturing keyboard and mouse actions over this preview window 38, a local user at the host computer 16 can effectively interact with the hosted desktop 40 using the preview window and without looking at the projected output 28A of the client projector 10. The Desktop Preview Injection Component 30 application thus provides an interactive GUI preview image of the hosted desktop on the Window's Logon screen.

The Desktop Screen Capture Component 32 application captures views of the hosted desktop 40 in the active remote desktop session host and provides the content to the receiving Desktop Preview Injection Component 30 application. The capture rate and transmission rate may be throttled according to many factors, including operating system restrictions, graphic card 10 speed, CPU performance, or other criteria. The capture mechanism may be complex or as simple as using BitBlt with the SRCCOPY or CAPTUREBLT flags specified.

The Desktop Screen Capture Component 32 and the Desktop Preview Injection Component 30 execute in separate Windows desktops on the host computer and need to exchange screen data. This may be configured in several ways. The challenge here is that each component may also be executing within different and isolated Window's sessions or stations.

In one embodiment of the present invention, a global shared memory mapped file is used. This can include global mutex objects or other common multi-threading techniques that also require a higher security privilege for access. In another embodiment a Windows named pipe 42 may be employed. This is the preferred method as captured content is effectively streamed to the preview component. Alternately, conventional network based server/client approaches using the local host machine address can be used to provide transport. Finally, a file based transfer mechanism may also be acceptable. The overall goal is to efficiently transfer the screen data from an application in one Window's desktop/session to the application running in the Window's Logon desktop/session for display.

Depending upon the chosen technique, the Desktop Preview Injection Component 30 uses different methods to update the application preview window view with new screen data. For example, a polling technique may be used check for newly updated display data stored in a common shared region. A request flag may signal the Desktop Screen Capture Component 32 to collect the next frame so that capture rate does not exceed a configurable preview display rate. Other event based signaling methods can be used that would wait for preview or capture threads until the coordinating process is ready. This can be in the form of data arrival on an event interface or other related methods.

The capture and playback rate throttling could also be affected by system load. Capture region and collection can be controlled according to more intelligent knowledge about utilization of the desktop, mouse pointer position, or any number of related signals.

Unlike data transmitted across the physical network, the display rate for the preview function can more closely approach real-time. Also, since the captured, transmitted, and received preview content remains on the same host computer 16, compression or other CPU intensive operations on the data exchanged may be unnecessary.

Figure 2:
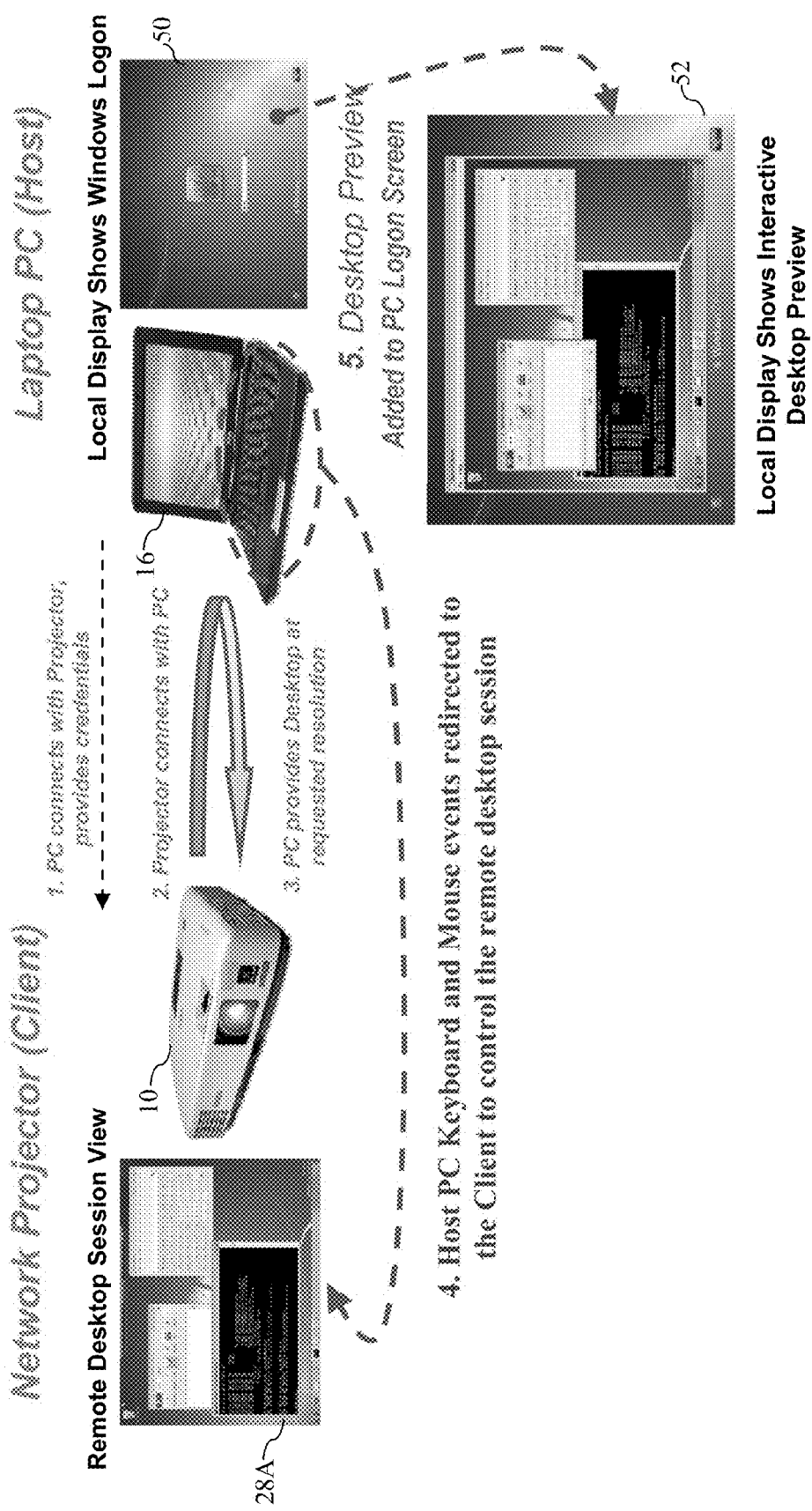
FIG. 2 illustrates the general steps of the method of the present invention.

FIG. 2 illustrates the general steps (1-5) of the present invention.

The process begins (step 1, FIG. 2) when the host user (individual operating his laptop 16) wishes to output his desktop on the client display (output of client projector 10) and signals the client. This may occur by an action that enables the host to connect to the client across the network 12. The ultimate goal of this initial connection is to inform the client that the host is ready to accept a remote desktop connection and requests that such connection to be made. It may also provide the client with access credentials and configuration settings for the connection. Alternately, the client may already have the access credentials and configuration settings of the host, for example from a previous remote desktop session with the host. Also, alternately, the client may be informed, i.e. signaled, that the user is ready to begin a remote desktop session by a user interface, e.g. a button on the client projector. A specific embodiment of this process step is described in commonly owned U.S. patent application Ser. No. 13/332,751, filed Dec. 21, 2011, which is hereby incorporated by reference in its entirety.

As shown generally as step 2 in FIG. 2, once client projector 10 has secured the host computer 16 user's remote access credentials, the client projector initiates the remote access desktop connection process and completes the remote access desktop connection to the host computer 16. This may be accomplished without exposing any initial client side user GUI querying connection details as those details have already been provided through web page interfaces. For example, in a Windows CE based network projector, the projector executes Microsoft's remote desktop connection client application (i.e. cetsc.exe) and provides the access credentials on the command line and in configuration files along with any other configuration options gathered by the web interface component.

Once established, this remote desktop connection provides the client application with views of the desktop of the host computer 16 provided across the network (shown generally as step 3 in FIG. 2). The display output path in the client projector 10 projects such views 28A onto a projection display surface.

Step 4 is related to commonly owned U.S. patent application Ser. No. 13/332,751, filed Dec. 21, 2011, in which client application Remote Desktop Connection 18 receives injected keyboard and mouse events from the operating session in the host computer 16 and executes them in the remote desktop session through the client as if they were local hardware devices.

Step 5 of FIG. 2 is premised on at least steps 1-3. In other words it starts with a client and a host connected to a local area network and where the client makes a remote desktop connection to the host. It is assumed that installation of required host software modules has already been performed. It is also assumed that the Remote Desktop Monitor Service 44 module is installed and activated on the host computer 16.

Remote Desktop Monitor Service 44 module detects when a remote desktop connection is established and a remote desktop session is created. When detected, the Remote Desktop Monitor Service 44 module uses the Desktop Screen Capture Component 32 to launch a screen capture process into the remote desktop session, and uses the Desktop Preview Injection Component 30 to launch a screen preview process into the Window's Session containing the active user's Window's Logon screen. The capture process obtains bitmaps of the remote desktop being hosted and shares them with the screen preview process through a named pipe or other inter-process/inter-session communication mechanism. The screen preview processes display of a GUI interface on the host display and paints the captured bitmaps it receives from the capture process.

The result is a preview image on the host computer 16 that closely matches the output emitted to the client projector 10 through the remote desktop connection. Preferably, the capture and displaying processes reoccur periodically so that the preview image is current. The periodic reoccurrence of capture and display may be throttled according to graphic card 10 speed, CPU performance, etc., as discussed previously.

Figure 3:
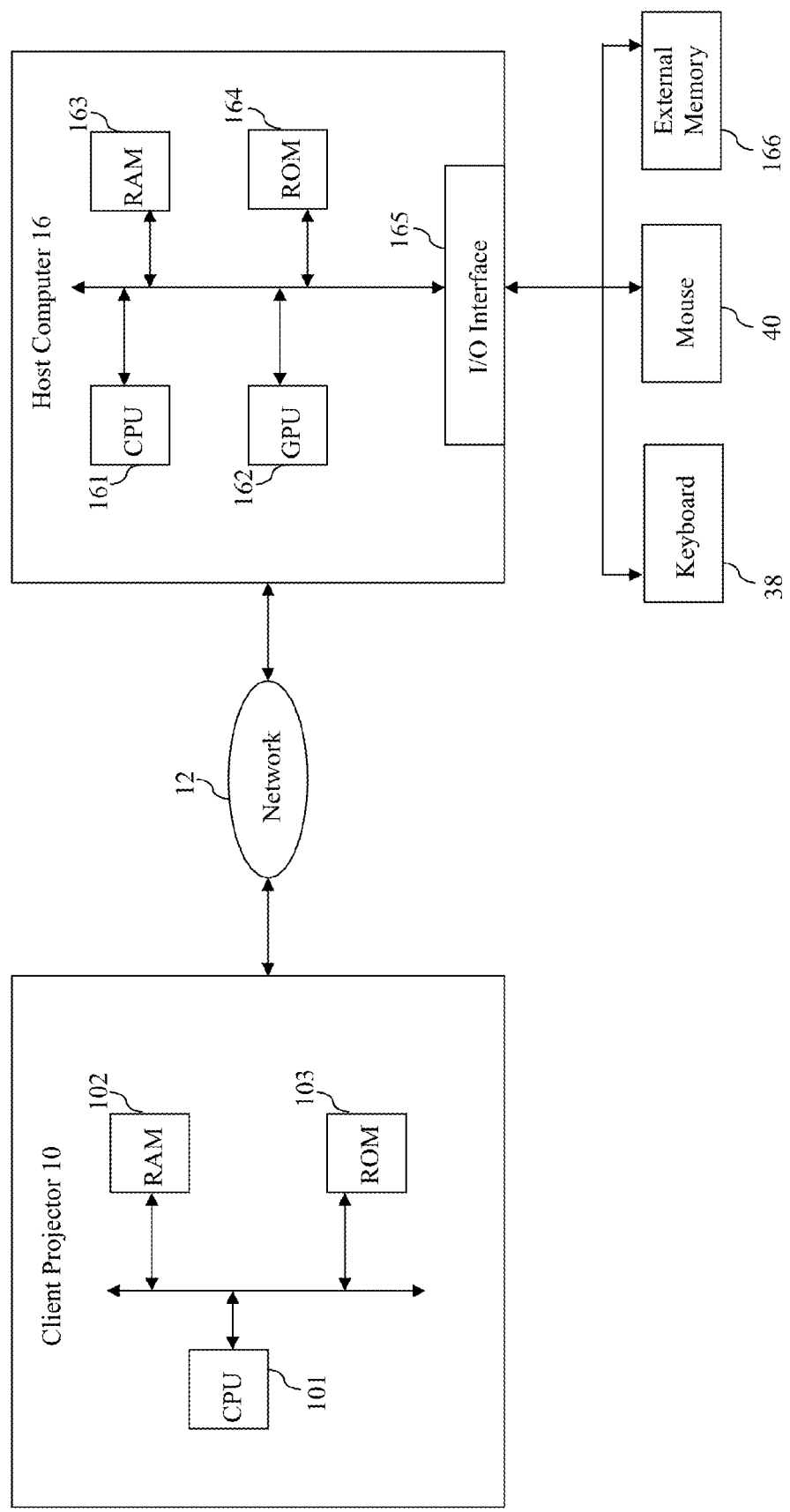
FIG. 3 is a simple block diagram of the processors and memory of the host computer and client projector of the present invention.

The method steps of the present invention described above are preferably performed by one or more processors in the host computer 16 and/or the client projector 10 executing computer-executable instructions, programs, software, firmware, that is stored or loadable in memory in host computer 16 and/or client projector 10 and/or in accessible external memory. FIG. 3 is a very simplified block diagram illustrating generally the processors and memory in host computer 16 and client projector 10. Host computer 16 processors may include, for example, a central processing unit (CPU) 161 and one or more graphical processing units (GPU) 162. The internal memory may include, for example, RAM 163 and ROM 164. I/O interface 165 enables communication with keyboard 38, mouse 40, and external memory 166, for example. Client projector 10 may similarly include a CPU 101, RAM 102, and ROM 102.

Various embodiments can be implemented in digital electronic circuitry, or in computer hardware, firmware, software, or in combinations of them. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims. For example, in one embodiment, the Desktop Preview Injection Component 30 application window can be resized and scaled by the host user. In another embodiment, the desktop content may not be scaled, but scrollbars or similar navigation elements are provided to be used to pan around larger sized desktop preview images.

In another embodiment, the preview application is divided into multiple interfaces. One interface may provide only a toolbar or button component on the Windows Logon screen which must first be selected to open the larger application window. This button may be designed to match similar components found on Windows operating system Logon screens. In one embodiment, the preview application window can be maximized to completely fill the host display. This provides as much area as possible for captured desktop content to be scaled and displayed. In another embodiment, this preview function is incorporated with the host keyboard and mouse redirection component of the invention described and claimed in commonly owned U.S. patent application Ser. No. 13/332,751, filed Dec. 21, 2011, which is hereby incorporated by reference in its entirety.

What is claimed is:

1. A method for displaying a hosted desktop in a remote desktop session between a client computing device and a host computer, the client computing device and the host computer being connected by a network, comprising:
   providing a projector as said client computing device, said projector being a client projector configured to execute a client-side application to establish said remote desktop session with said host computer;
   providing said host computer, said host computer being configured to execute a serving function in said remote desktop session with said client projector, said host computer having a host image display and a host-input device for receiving host-user inputs, said host computer supporting multiple logical display surfaces, each logical display surface being a logical space having a screen image displayable on said host image display, wherein only one logical display surface is displayable on said image display at a time;
   establishing a remote desktop session between the client projector and the host computer over said network, said remote desktop session being characterized by the following limitations:
      (a) said host computer executing a first computing session hosting a local logical display surface, said local logical display surface being a logon desktop, and as part of said remote desktop session, exclusively displaying said logon desktop on the host image display and directing all host-user inputs from the host-input device exclusively to said logon desktop:
      (b) said host computer executing a second computing session separate and secure from the first computing session and hosting a user desktop of the client projector, transferring control of the user desktop running on the host computer to the client projector, and transferring the user desktop directly to said client projector for display by said client projector, said user desktop being said hosted desktop;
      c) said hosted desktop on the host computer being, configured to be controlled by the client projector by receiving user-input signals from the client projector:
   wherein in the host computer:
      in response to the establishing of the remote desktop session, capturing an image of the hosted desktop and loading a Desktop Preview Injection Component into the logon desktop, the Preview Injection Component providing an application window that runs on the logon desktop and provides the captured image of the hosted desktop for viewing in the host image display.

2. The method as in claim 1, wherein:
   the computing session that hosts the logical display surface that is currently being displayed on said image display is termed an active console session; and
   determination of whether the remote desktop session is established is made by identifying an active process matching a name of a logon application and determining if the active process belongs to the active console session.

3. The method of claim 1, wherein the Preview Injection Component further captures host-user inputs from the host-input device that are directed to the logon desktop, and redirects the captured host-user inputs to the hosted desktop as if the captured host-user inputs were sent from the client projector.

4. The method of claim 3, wherein the Preview Injection Component redirects the captured host-user inputs to the hosted desktop by sending the captured host-user inputs to said client projector over said network, and
   in response to receiving the redirected host-user input signals from the host computer, the client projector resends the received host-user input signals over said network to the hosted desktop on the host computer as said user-input signals from the client projector to control the hosted desktop running on said host computer as if the received host-user inputs were generated at the client projector by a client-input device connected to the client projector.

5. The method of claim 3, wherein the Preview Injection Component redirects the captured host-user inputs to the hosted desktop as injected events.

6. The method of claim 1, wherein the image of the hosted desktop is captured by loading a Desktop Screen Capture Component into the hosted desktop, the Desktop Screen Capture Component capturing a sequence of images of the hosted desktop and transferring them to the Desktop Preview Injection Component, the Desktop Preview Injection Component treating each transferred image in the sequence of images as said captured image of the hosted desktop.

7. The method of claim 6, wherein the captured sequence of images of the hosted desktop are transferred from the Desktop Screen Capture Component of the hosted desktop to the Desktop Preview Injection Component of the logon desktop by use of a shared memory space accessible by both the Desktop Screen Capture Component and the Preview Injection Component.

8. The method of claim 7 further comprising, updating the application window with image content from the shared memory space in response to the shared memory space being updated.

9. The method of claim 1, wherein the logon desktop has a logon application that provides at least one input-text field, and the application window provided by the Preview Injection Component completely covers any input-text fields provided by the logon application.

10. The method of claim 1, wherein the remote desktop session between the client projector and the host computer is established using the Remote Desktop Protocol.

11. The method of claim 1, wherein said remote desktop session is further characterized in that the remote desktop session establishes a one-to-one session between the host computing device and the client computing device so that the hosted desktop is transferred only to said client projector during said remote desktop session.

12. A system for displaying a hosted desktop in a remote desktop session, comprising:
   a client computing device and a host computer connected by a network, said remote desktop session being established between the client computing device and the host computer, wherein:
   the client computing device is a client projector configured to execute a client-side application to establish said remote desktop session with said host computer,
   said host computer is configured to execute a serving function in said remote desktop session with said client projector, said host computer having a host image display and a host-input device for receiving host-user inputs, said host computer supporting multiple logical display surfaces, each logical display surface being a logical space having a screen image displayable on said host image display, wherein only one logical display surface is displayable on said image display at a time;
   wherein said remote desktop session is characterized by the following limitations:

(a) said host computer executes a first computing session hosting a local logical display surface, said local logical display surface being a logon desktop, and as part of said remote desktop session, exclusively displaying said logon desktop on the host image display and directing all host-user inputs from the host-input device exclusively to said logon desktop;

(b) said host computer executing a second computing session separate and secure from the first computing session and hosting a user desktop of the client projector, transferring control of the user desktop running on the host computer to the client projector. and transferring the user desktop directly to said client projector for display by said client projector, said user desktop being said hosted desktop;

(c) said hosted desktop on the host computer being configured to be controlled by the client projector by receiving user-input signals from the client projector; and wherein in the host computer, in response to the remote desktop session being established, an image of the hosted desktop is captured and a Desktop Preview Injection Component is loaded into the logon desktop, the Preview Injection Component provides an application window that runs on the logon desktop and provides the captured image of the hosted desktop for viewing in the host image display.

13. The system as in claim 12, wherein:
the computing session that hosts the logical display surface that is currently being displayed on said image display is termed an active console session; and
determination of whether the remote desktop session is established is made by identifying an active process matching a name of a logon application and determining if the identified active process belongs to the active console session.

14. The system of claim 12, wherein the Preview Injection Component further captures host-user inputs from the host-input device that are directed to the logon desktop, and redirects the captured host-user inputs to the hosted desktop as if the captured host-user inputs were sent from the client projector.

15. The system of 14, wherein the Preview Injection Component redirects the captured host-user inputs to the hosted desktop by sending the captured host-user inputs to said client projector over said network, and in response to receiving the redirected host-user input signals from the host computer, the client projector resends the received host-user input signals over said network to the hosted desktop on the host computer as said user-input signals from the client projector to control the hosted desktop running on said host computer as if the received host-user inputs were generated at the client projector by a client-input device connected to the client projector.

16. The system of 14, wherein the Preview Injection Component redirects the captured host-user inputs to the hosted desktop as injected events.

17. The system of claim 12, wherein the image of the hosted desktop is captured by loading a Desktop Screen Capture Component into the hosted desktop, the Desktop Screen Capture Component capturing a sequence of images of the hosted desktop and transferring them to the Desktop Preview Injection Component, the Desktop Preview Injection Component treating each transferred image in the sequence of images as said captured image of the hosted desktop.

18. The system of claim 17, wherein the captured sequence of images of the hosted desktop are transferred from the Desktop Screen Capture Component of the hosted desktop to the Desktop Preview Injection Component of the logon desktop by use of a shared memory space accessible by both the Desktop Screen Capture Component and the Preview Injection Component.

19. The system of claim 12, wherein the logon desktop has a logon application that provides at least one input-text field, and the application window provided by the Preview Injection Component completely covers any input-text fields provided by the logon application.

20. One or more tangible, non-transitory computer-readable media embodying instructions executable by a computer to perform the method of claim 1.

* * * * *